(12) United States Patent
Yumer

(10) Patent No.: US 9,813,437 B2
(45) Date of Patent: Nov. 7, 2017

(54) SYSTEMS AND METHODS FOR DETERMINING MALICIOUS-DOWNLOAD RISK BASED ON USER BEHAVIOR

(71) Applicant: Symantec Corporation, Mountain View, CA (US)

(72) Inventor: Leylya Yumer, Antibes (FR)

(73) Assignee: Symantec Corporation, Mountain View, CA (US)

( * ) Notice: Subject to any disclaimer, the term of this patent is extended or adjusted under 35 U.S.C. 154(b) by 100 days.

(21) Appl. No.: 14/739,385

(22) Filed: Jun. 15, 2015

(65) Prior Publication Data

US 2016/0366167 A1     Dec. 15, 2016

(51) Int. Cl.
| | |
|---|---|
| G06F 21/00 | (2013.01) |
| H04L 29/06 | (2006.01) |
| G06F 21/50 | (2013.01) |
| G06F 21/56 | (2013.01) |
| G06F 21/57 | (2013.01) |

(52) U.S. Cl.
CPC ........ *H04L 63/1425* (2013.01); *G06F 21/50* (2013.01); *G06F 21/56* (2013.01); *G06F 21/577* (2013.01); *H04L 63/1433* (2013.01)

(58) Field of Classification Search
CPC ............. H04L 63/1425; H04L 63/1433; G06F 21/577; G06F 21/56; G06F 21/05
See application file for complete search history.

(56) References Cited

U.S. PATENT DOCUMENTS

| | | |
|---|---|---|
| 7,647,622 B1 | 1/2010 | Sobel et al. |
| 8,181,251 B2 | 5/2012 | Kennedy |
| 8,280,830 B2 | 10/2012 | Kennedy |
| 8,464,345 B2 | 6/2013 | Satish et al. |
| 8,478,708 B1 | 7/2013 | Larcom |
| 8,635,171 B1 | 1/2014 | Kennedy |
| 8,776,168 B1 | 7/2014 | Gibson et al. |

(Continued)

OTHER PUBLICATIONS

Leylya Yumer, et al; Systems and Methods for Preventing Targeted Malware Attacks; U.S. Appl. No. 14/569,302, filed Dec. 12, 2014.

(Continued)

*Primary Examiner* — Techane Gergiso
*Assistant Examiner* — Tri Tran
(74) *Attorney, Agent, or Firm* — FisherBroyles, LLP

(57) ABSTRACT

The disclosed computer-implemented method for determining malicious-download risk based on user behavior may include (1) identifying a set of users that are at high risk for malicious downloads and a set of users that are at low risk for malicious downloads, (2) determining a high-risk pattern of download behavior that is shared by the set of high-risk users and that is not shared by the set of low-risk users, (3) analyzing download behavior of an uncategorized user over a predefined time period in order to categorize the download behavior as high-risk or low-risk, and (4) categorizing the uncategorized user as a high-risk user in response to determining that the download behavior of the uncategorized user falls within a predefined similarity threshold of the high-risk pattern of download behavior. Various other methods, systems, and computer-readable media are also disclosed. Various other methods, systems, and computer-readable media are also disclosed.

18 Claims, 7 Drawing Sheets

(56) References Cited

U.S. PATENT DOCUMENTS

| | | | |
|---|---|---|---|
| 2005/0120242 A1* | 6/2005 | Mayer | G06F 21/56 726/4 |
| 2010/0083376 A1 | 4/2010 | Pereira et al. | |
| 2010/0162395 A1 | 6/2010 | Kennedy | |
| 2011/0055123 A1 | 3/2011 | Kennedy | |
| 2011/0271341 A1 | 11/2011 | Satish et al. | |
| 2011/0283361 A1 | 11/2011 | Perdisci et al. | |
| 2012/0144492 A1* | 6/2012 | Griffin | G06F 21/56 726/25 |
| 2013/0097701 A1* | 4/2013 | Moyle | G06F 21/552 726/22 |
| 2014/0201208 A1 | 7/2014 | Satish et al. | |
| 2015/0172303 A1 | 6/2015 | Humble et al. | |

OTHER PUBLICATIONS

Canali, Davide et al., "On the Effectiveness of Risk Prediction Based on Users Browsing Behavior", ASIA CCS'14, Kyoto, Japan, (Jun. 4-6, 2014).

Yufei Han, et al; Systems and Methods for Evaluating Infection Risks Based on Profiled User Behaviors; U.S. Appl. No. 15/188,956, filed Jun. 21, 2016.

Yves Grandvalet and Yoshua Bengio, Semi-supervised Learning by Entropy Minimization, Proceedings of Advances in Neural Information Processing Systems, NIPS 2004, Vancouver. 2004.

Boaz Nadler and Nathan Srebro, Semi-supervised Learning with the Graph Laplacian: the limit of infinite unlabeled data, Proceedings of Advances in Neural Information Processing Systems, NIPS 2009, USA. 2009.

Naoki Abe, Bianca Zadrozny and John Langford, Outlier detection by active learning, Proceedings of the 12th ACM SIGKDD international conference on Knowledge discovery and data mining, 2006, PA, USA. 2006.

T.Lane. A Decision-Theoretic, Semi-Supervised Model for Intrusion Detection, Machine Learning and Data Mining for Computer Security, Springer London. 2006.

Kirat, Dhilung et al.; SigMal: a Static Signal Processing Based Malware Triage; ACSAC '13, Proceedings of the 29th Annual Computer Security Applications Conference, New Orleans, Louisiana; Dec. 9-13, 2013.

Gandotra, Ekta et al.; Malware Analysis and Classification: A Survey; Journal of Information Security, 2014, 5; Apr. 2014.

Aung, Zarni et al.; Permission-Based Android Malware Detection; www.ijstr.org; International Journal of Scientific & Technology Research vol. 2, Issue 3, ISSN 2277-8616; Mar. 2013.

Morovati, Kamran et al.; Malware Detection Through Decision Tree Classifier; CSEE 2013; 2013.

Rieck, Konrad et al.; Automatic Analysis of Malware Behavior using Machine Learning; Journal of Computer Security; 2011.

Ajitesh Roychowdhury, et al; Systems and Methods for Automated Generation of Generic Signatures Used to Detect Polymorphic Malware; U.S. Appl. No. 15/041,043, filed Feb. 11, 2016.

Mark Kennedy, et al.; Automatic Generation of Generic File Signatures; U.S. Appl. No. 14/481,763; filed Sep. 9, 2014.

Newsome, James et al.; Polygraph: Automatically Generating Signatures for Polymorphic Worms; http://repository.cmu.edu/cgi/viewcontent.cgi?article=1028&context=ece, as accessed Nov. 17, 2015; 2005.

Petrus Johannes Viuoen, et al; Systems and Methods for Improving the Classification Accuracy of Trustworthiness Classifiers; U.S. Appl. No. 14/836,991, filed Aug. 27, 2015.

Rouse, Margaret; polymorphic malware; http://searchsecurity.techtarget.com/definition/polymorphic-malware, as accessed Nov. 17, 2015; Apr. 19, 2007.

Sourabh Satish; Systems and Methods for Updating Generic File-Classification Definitions; U.S. Appl. No. 14/210,364, filed Mar. 13, 2014.

Wicherski, Georg; peHash: A Novel Approach to Fast Malware Clustering; https://www.usenix.org/legacy/event/leet09/tech/full_papers/wicherski/wicherski.pdf, as accessed Nov. 17, 2015; 2009.

* cited by examiner

SYSTEMS AND METHODS FOR DETERMINING MALICIOUS-DOWNLOAD RISK BASED ON USER BEHAVIOR

BACKGROUND

Malware is a constant problem for both individual users and organizations. Malicious applications can slow down a computer, encrypt or delete important data, steal sensitive information, and cause a myriad of other problems. Many resources are already devoted to the task of protecting computing devices from malware, such as firewalls, anti-virus applications, spam filters, and anti-spyware applications. Many of these anti-malware applications are dedicated to removing malicious files already on the computing device, but the ideal anti-malware application is one that prevents malware infection from ever taking place.

While some traditional systems may prevent an uninfected user from downloading malware, many applications struggle to keep up with the ever-growing number and type of malicious applications that may be downloaded at any moment by an unwary user. Some traditional systems may limit user downloads or setting changes, increasing a user's protection at the cost of decreasing the usability of their computing device. Because any anti-malware application consumes computing resources, most users do not wish to run more anti-malware applications than necessary. Determining what sort of malware prevention system is necessary for a particular user requires an ability to predict the user's likelihood of encountering malware. Accordingly, the instant disclosure identifies and addresses a need for additional and improved systems and methods for detecting malware.

SUMMARY

As will be described in greater detail below, the instant disclosure describes various systems and methods for determining malicious-download risk based on user behavior by monitoring a user's pattern of download behavior, comparing the pattern of download behavior to the download behavior of other users who became infected with malware, and determining, based on the comparison, if the user is likely to download malware in the future.

In one example, a computer-implemented method for determining malicious-download risk based on user behavior may include (1) identifying a set of users that are at high risk for malicious downloads and a set of users that are at low risk for malicious downloads, (2) determining a high-risk pattern of download behavior that is shared by the set of high-risk users and that is not shared by the set of low-risk users, (3) analyzing download behavior of an uncategorized user over a predefined time period in order to categorize the download behavior as high-risk or low-risk, and (4) categorizing the uncategorized user as a high-risk user in response to determining that the download behavior of the uncategorized user falls within a predefined similarity threshold of the high-risk pattern of download behavior.

In some examples, the computer-implemented method may further include increasing a security posture of the high-risk user in order to reduce the risk of the high-risk user becoming infected with malware. In other examples, the computer-implemented method may further include collecting additional data about the high-risk user in order to improve the accuracy of the high-risk pattern of download behavior at predicting malware infections and/or improve the accuracy of additional malware-infection-prediction systems. Additionally or alternatively, the computer-implemented method may further include increasing the security posture of an organization that may include the high-risk user in order to reduce the risk of computing devices used by the organization becoming infected with malware.

In some embodiments, identifying the set of high-risk users and the set of low-risk users may include monitoring the download behavior of a set of unclassified users over a predefined download monitoring time period. In this embodiment, identifying the users may further include classifying users whose computing devices became infected with malware during the predefined download monitoring time period as the set of high-risk users and classifying users whose computing devices did not become infected with malware during the predefined download monitoring time period as the set of low-risk users.

In one example, the high-risk pattern of download behavior may include (1) the total number of files on a computing device used by the high-risk user to download files, (2) a reputation score that applies to at least one file on a computing device used by the high-risk user to download files and that is below a predefined reputation score threshold, (3) at least one file that is on a computing device used by the high-risk user to download files and that is below a predefined frequency threshold on computing devices used by other users, (4) a timestamp of a download of at least one file on a computing device used by the high-risk user to download files, and/or (5) a category of at least one file on a computing device used by the high-risk user to download files. In another example, the high-risk pattern of download behavior may include (1) the total number of distinct file names on a computing device used by the high-risk user to download files, (2) a reputation score that applies to at least one distinct file name on a computing device used by the high-risk user to download files and that is below a predefined reputation score threshold, (3) at least one distinct file name that is on a computing device used by the high-risk user to download files and that is below a predefined frequency threshold on computing devices used by other users, and/or (4) a timestamp of a download of at least one distinct file name on a computing device used by the high-risk user to download files. Additionally or alternatively, the high-risk pattern of download behavior may include (1) the total number of distinct file paths on a computing device used by the high-risk user to download files, (2) a reputation score that applies to at least one distinct file path on a computing device used by the high-risk user to download files and that is below a predefined reputation score threshold, (3) at least one distinct file path that is on a computing device used by the high-risk user to download files and that is below a predefined frequency threshold on computing devices used by other users, and/or (4) a timestamp of a creation of at least one distinct file path on a computing device used by the high-risk user to download files.

In one embodiment, the computer-implemented method may further include periodically analyzing additional download behavior of a previously categorized user with an assigned risk category over an additional predefined time period in order to categorize the download behavior as high-risk or low-risk and adjusting the assigned risk category of the previously categorized user in response to determining that the download behavior of the previously categorized has changed with respect to the high-risk pattern of download behavior. Additionally or alternatively, the computer-implemented method may further include identifying a new set of users that are at high risk for malicious downloads and updating the high-risk pattern of download behavior in response to at least one change in download behavior between the set of high-risk users and the new set of high-risk users.

In one embodiment, a system for implementing the above-described method may include (1) an identification module, stored in memory, that identifies a set of users that are at high risk for malicious downloads and a set of users that are at low risk for malicious downloads, (2) a determination module, stored in memory, that determines a high-risk pattern of download behavior that is shared by the set of high-risk users and that is not shared by the set of low-risk users, (3) an analysis module, stored in memory, that analyzes download behavior of an uncategorized user over a predefined time period in order to categorize the download behavior as high-risk or low-risk, (4) a categorization module, stored in memory, that categorizes the uncategorized user as a high-risk user in response to determining that the download behavior of the uncategorized user falls within a predefined similarity threshold of the high-risk pattern of download behavior, and (5) at least one physical processor configured to execute the identification module, the determination module, the analysis module, and the categorization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a set of users that are at high risk for malicious downloads and a set of users that are at low risk for malicious downloads, (2) determine a high-risk pattern of download behavior that is shared by the set of high-risk users and that is not shared by the set of low-risk users, (3) analyze download behavior of an uncategorized user over a predefined time period in order to categorize the download behavior as high-risk or low-risk, and (4) categorize the uncategorized user as a high-risk user in response to determining that the download behavior of the uncategorized user falls within a predefined similarity threshold of the high-risk pattern of download behavior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
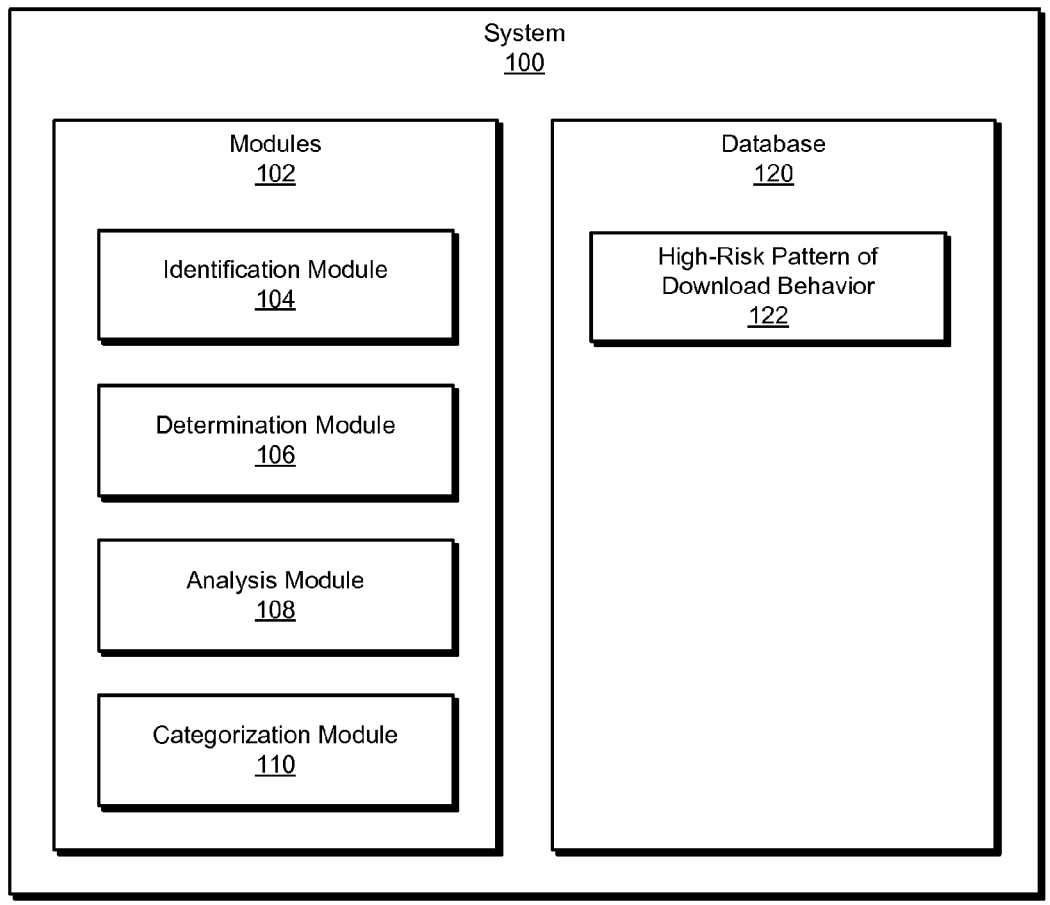
FIG. 1 is a block diagram of an exemplary system for determining malicious-download risk based on user behavior.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for determining malicious-download risk based on user behavior. As will be explained in greater detail below, by using benign download behavior to predict the risk of future malicious download behavior, the systems described herein may be able to protect high-risk users before the users become infected, gather valuable information about the download habits of high-risk users, and/or protect organizations from being compromised by the high-risk behavior of their members.

Figure 2:
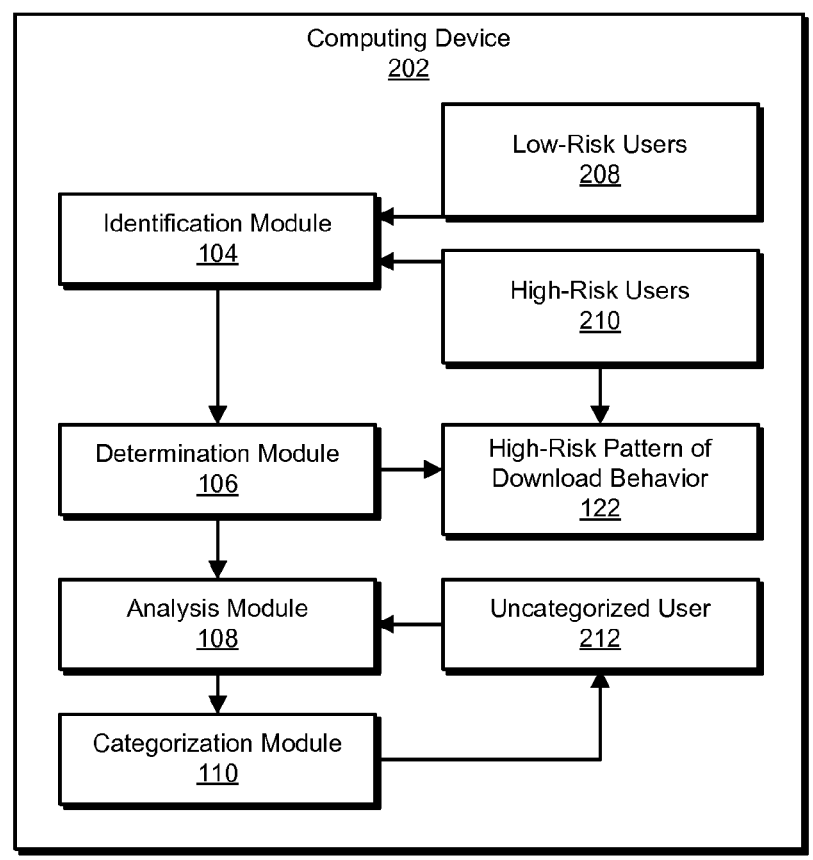
FIG. 2 is a block diagram of an additional exemplary system for determining malicious-download risk based on user behavior.
Figure 4:
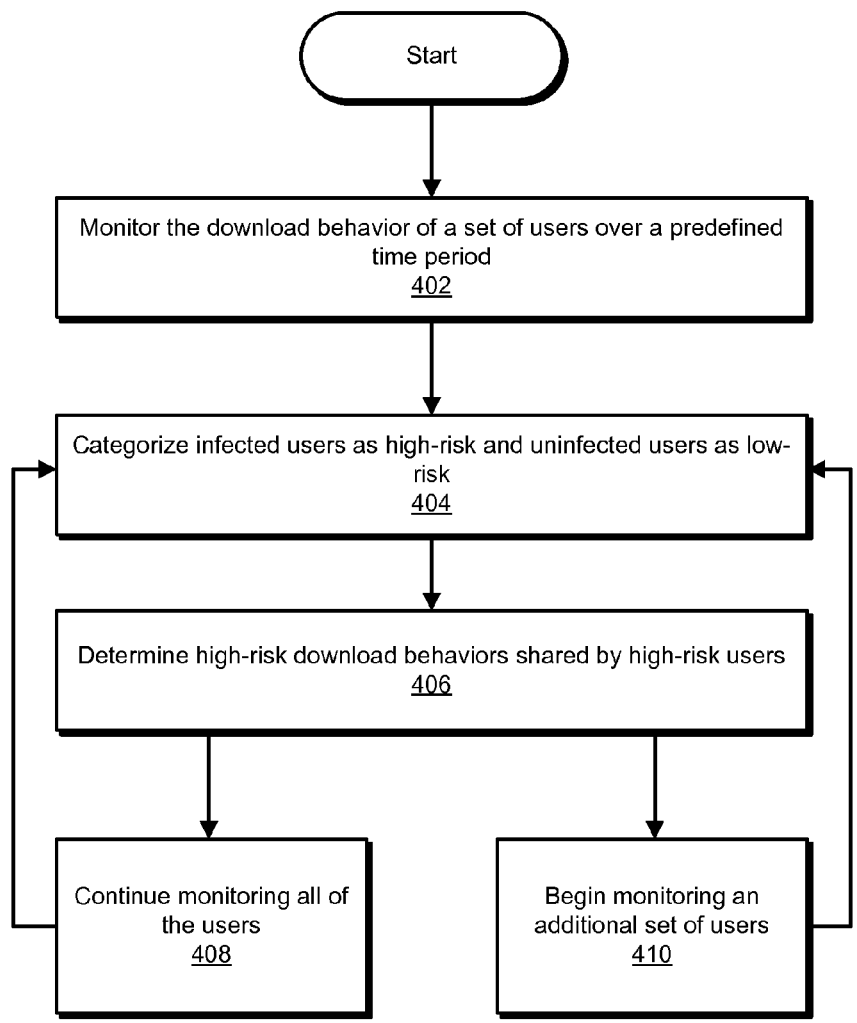
FIG. 4 is a flow diagram of an exemplary method for determining malicious-download risk based on user behavior.
Figure 5:
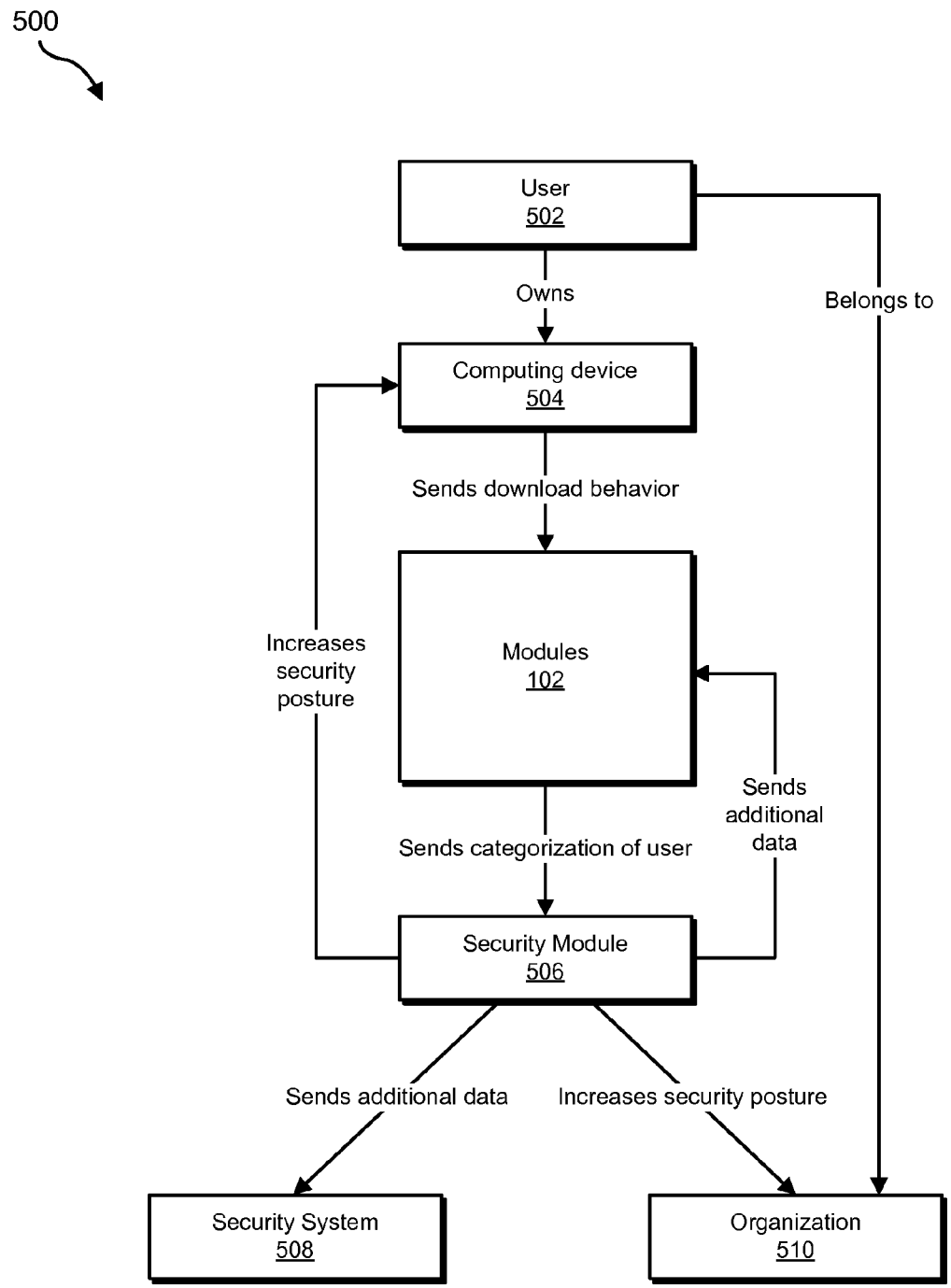
FIG. 5 is a block diagram of an exemplary computing system for determining malicious-download risk based on user behavior.

The following will provide, with reference to FIGS. 1, 2, and 5, detailed descriptions of exemplary systems for determining malicious-download risk based on user behavior. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for determining malicious-download risk based on user behavior. As illustrated in this figure, exemplary system 100 may include one or more modules 102 for performing one or more tasks. For example, and as will be explained in greater detail below, exemplary system 100 may include an identification module 104 that identifies a set of users that are at high risk for malicious downloads and a set of users that are at low risk for malicious downloads. Exemplary system 100 may additionally include a determination module 106 that determines a high-risk pattern of download behavior that is be shared by the set of high-risk users and that is not shared by the set of low-risk users. Exemplary system 100 may also include an analysis module 108 that analyzes the download behavior of an uncategorized user over a predefined time period in order to categorize the download behavior as high-risk or low-risk. Exemplary system 100 may additionally include a categorization module 110 that categorizes the uncategorized user as a high-risk user in response to determining that the download behavior of the uncategorized user falls within a predefined similarity threshold of the high-risk pattern of download behavior. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store previously identified patterns of download behavior, such as high-risk pattern of download behavior 122. Database 120 may represent portions of a single database or computing device or a plurality of databases or computing devices. For example, database 120 may represent a portion of computing system 610 in FIG. 6 and/or portions of exemplary network architecture 700 in FIG. 7. Alternatively, database 120 in FIG. 1 may represent one or more physically separate devices capable of being accessed by a computing device, such computing system 610 in FIG. 6 and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to determine malicious-download risk based on user behavior. For example, and as will be described in greater detail below, identification module 104 may identify a set of users 210 that are at high risk for malicious downloads and a set of users 208 that are at low risk for malicious downloads. Next, determination module 106 may determine a high-risk pattern of download behavior 122 that is shared by set of high-risk users 210 and that is not shared by set of low-risk users 208. At some later time, analysis module 108 may analyze the download behavior of an uncategorized user 212 over a predefined time period in order to categorize the download behavior as high-risk or low-risk. Finally, categorization module 110 may categorize uncategorized user 212 as a high-risk user in response to determining that the download behavior of uncategorized user 212 falls within a predefined similarity threshold of high-risk pattern of download behavior 122.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
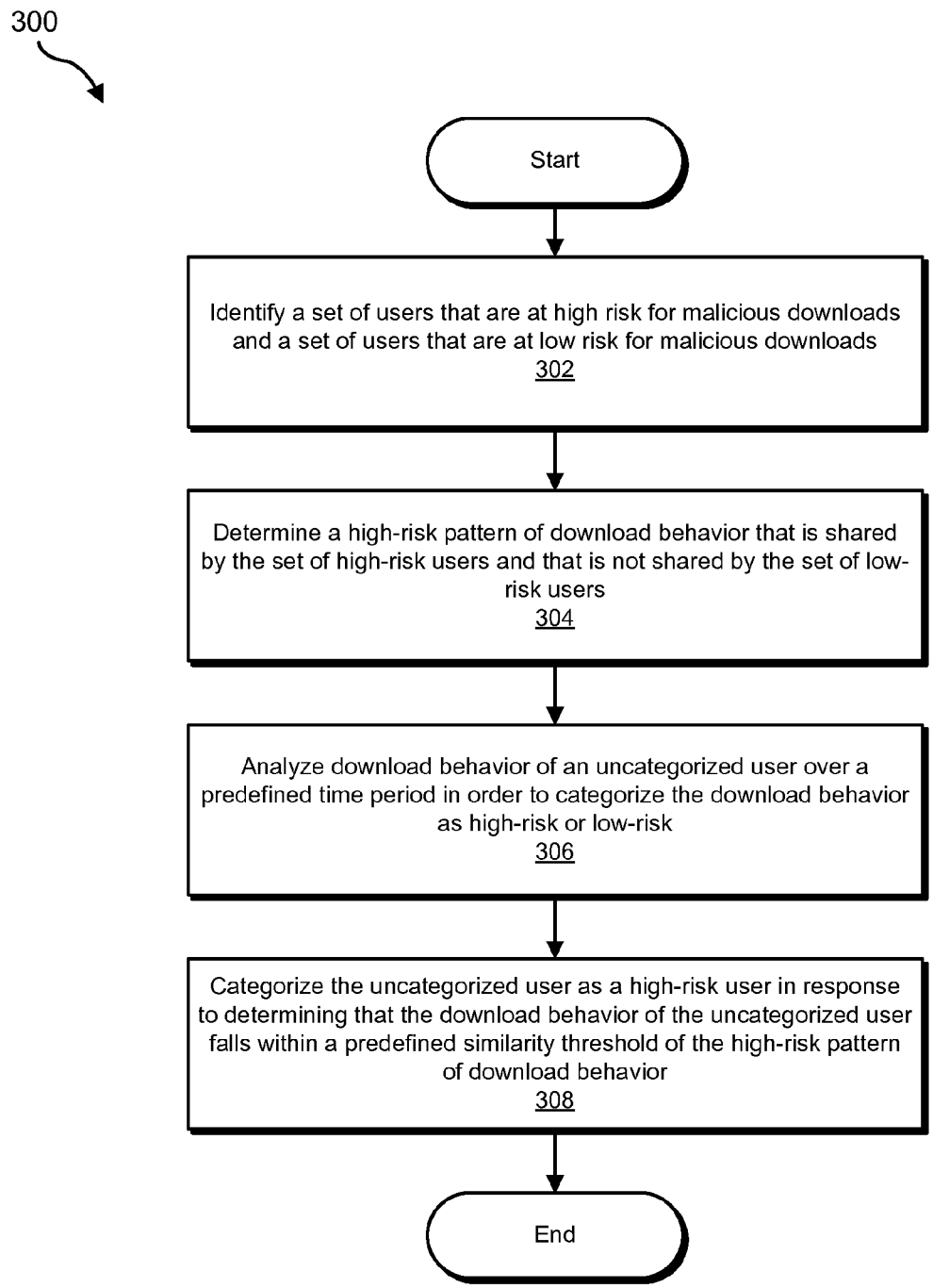
FIG. 3 is a flow diagram of an exemplary method for determining malicious-download risk based on user behavior.

FIG. 3 is a flow diagram of an exemplary computer-implemented method 300 for determining malicious-download risk based on user behavior. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a set of users that are at high risk for malicious downloads and a set of users that are at low risk for malicious downloads. For example, identification module 104 may, as part of computing device 202 in FIG. 2, identify a set of users 210 that are at high risk for malicious downloads and a set of users 208 that are at low risk for malicious downloads.

The term "malicious downloads," as used herein, generally refers to any type of file, script, and/or application that may perform unwanted actions on a computing device. In some examples, a malicious download may include a piece of malware and/or an application that downloads a piece of malware. A malicious download may be intentionally or unintentionally initiated by a user. Examples of malicious downloads include, without limitation, viruses, keyloggers, Trojans, spyware, and/or spamware.

Identification module 104 may identify the set of high-risk users and the set of low-risk users in a variety of ways. For example, identification module 104 may identify the set of high-risk users and the set of low-risk users by monitoring the download behavior of a set of unclassified users over a predefined download monitoring time period. In this example, identification module 104 may classify users whose computing devices became infected with malware during the predefined download monitoring time period as high-risk users and users whose computing devices did not become infected with malware during the predefined download monitoring time period as low-risk users. Identification module 104 may identify infected users by using any type of malware-detection application. Additionally or alternatively, identification module 104 may classify as high-risk users any users who were the target of a cyber-attack, such as the targets of spear-phishing emails.

In some embodiments, identification module 104 may only classify users into two risk categories, high-risk and low-risk. In other embodiments, identification module 104 may classify users on a continuum, such as from no-risk to very-high-risk. For example, identification module 104 may classify users who have no download activity at all as no-risk, users who have some download activity but do not encounter malware as low-risk, users who download a single piece of relatively harmless malware (e.g., an ad-laden browser toolbar) as moderate-risk, users who download multiple pieces of malware as high-risk, and/or users who download a large amount of malware as very-high-risk. Additionally or alternatively, identification module 104 may classify users using a numerical score, such as the percentage likelihood that the user will download malware during a given time period.

At step 304, one or more of the systems described herein may determine a high-risk pattern of download behavior that is shared by the set of high-risk users and that is not shared by the set of low-risk users. For example, determination module 106 may, as part of computing device 202 in FIG. 2, determine a high-risk pattern of download behavior 122 that is shared by set of high-risk users 210 and that is not shared by set of low-risk users 208.

The term "download behavior," as used herein, generally refers to any instance in which a file from an external source is copied to and/or created on a computing device. In some embodiments, download behavior may refer to files and/or folders downloaded from the Internet. Download behavior may be initiated by a user, for example by clicking on a link, or by a file already on the user's device, such as an application automatically downloading an update. A pattern of download behavior may include information such as when files are downloaded, how many files are downloaded, where files are downloaded from, where files are downloaded to, metadata about the downloaded files, and/or any other information relating to file downloads.

Determination module 106 may determine the high-risk pattern of download behavior in a variety of ways. For example, determination module 106 may analyze the download behavior of the low-risk users, analyze the download behavior of the high-risk users, and categorize any download behavior that is common across the high-risk users but rare in the low-risk users as a high-risk download behavior. The high-risk pattern of download behavior may include some or all of the high-risk download behaviors found by determination module 106. In some embodiments, determination module 106 may give different download behaviors different weights when calculating the high-risk pattern of download behavior. In one embodiment, determination module 106 may use machine-learning algorithms to determine the high-risk pattern of download behavior. For example, determination module 106 may use support vector machines to determine the high-risk pattern of download behavior.

In some embodiments, determination module 106 may detect high-risk download behaviors by looking at the attributes of files on users' computers. The term "file," as used herein, may refer to the code and/or metadata of a file, the name of a file, and/or any unique representation of a file, such as a hash and/or fingerprint of the file.

In one embodiment, the high-risk pattern of download behavior may include the total number of files on a computing device used by the high-risk user to download files. In some examples, determination module 106 may examine the total number of files on the computing device and/or the total number of files downloaded to the computing device during the download monitoring time period. Determination module 106 may also examine other characteristics of the files, such as the size of the files, the reputation of the files, and/or the category of the files. For example, determination module 106 may determine that downloading one or more files that fall below a predefined reputation score threshold is a high-risk download behavior. In another example, determination module 106 may determine that downloading files in the "gambling application" category is riskier than downloading files in the "software development applications" category. Other examples of file categories include, without limitation, computer security tools, file-sharing applications, engineering tools, trading tools, multimedia applications, and/or gaming applications. In some embodiments, determination module 106 may determine the category of a file based at least in part on the signer of the file.

In some embodiments, the high-risk pattern of download behavior may include at least one file that is on a computing device used by the high-risk user to download files and that is below a predefined frequency threshold on computing devices used by other users. For example, if a file is found on less than 1% of computing devices used by other users, determination module 106 may determine that downloading that file is a high-risk download behavior. In another example, if a file is found on over 50% of computing devices used by other users, determination module 106 may determine that downloading that file is not a high-risk download behavior. In one example, determination module 106 may determine that users who routinely download files that appear on fewer than 10% of other users' computing devices mostly fall into the high-risk user category and that therefore the predefined frequency threshold is 10%.

Additionally or alternatively, the high-risk pattern of download behavior may include a timestamp of a download of at least one file on a computing device used by the high-risk user to download files. In some examples, files may download automatically at certain times, such as when an application updates or when a malware application contacts a control server. In these examples, determination module 106 may determine that legitimate applications are likely to download updates at a different time from malware applications. In other examples, users who regularly download files from the Internet at different hours may have different download patterns with respect to application categories. For example, a user may be less likely to download a malware-infected gambling application during normal working hours. In one example, determination module 106 may determine that users who regularly download files at 2 A.M. are at high risk for downloading malicious files while users who typically only download files between 9 A.M. and 5 P.M. are at low risk for downloading malicious files. In this example, determination module 106 may determine that downloading files late at night is a high-risk download behavior.

In some embodiments, determination module 106 may determine the high-risk pattern of download behavior by examining the file paths where the user initially downloads files, stores downloaded files, and/or executes downloaded files. In one embodiment, the high-risk pattern of download behavior may include the total number of distinct file paths on a computing device used by the high-risk user to download files. For example, determination module 106 may determine that a user who stores all of their downloaded files in a single downloads directory (e.g., their browser's default download directory) is at a higher risk for malicious downloads than a user who downloads files to different directories. In another example, determination module 106 may determine that a user who downloads many files to the same few directories (e.g., by downloading multiple different applications from the same reputable publishers) is at a lower risk for malicious downloads than a user who downloads many files to many different directories.

In some examples, the high-risk pattern of download behavior may include a reputation score that applies to at least one distinct file path on a computing device used by the high-risk user to download files and that is below a predefined reputation score threshold. For example, determination module 106 may determine that a user who downloads a file to the low-reputation file path "C:\Program Files\MalwareDistributorsInc" is at high risk for malicious downloads.

In other examples, the high-risk pattern of download behavior may include at least one distinct file path that is on a computing device used by the high-risk user to download files and that is below a predefined frequency threshold on computing devices used by other users. Because file paths are frequently segregated according to publisher, a less common file path may indicate that a user is downloading files from a less well-known and possibly less reputable publisher. For example, determination module 106 may determine that users who routinely download files to file paths that appear on fewer than 5% of other users' computing devices mostly fall into the high-risk user category and that therefore the predefined frequency threshold is 5%.

Additionally or alternatively, the high-risk pattern of download behavior may include the timestamp of a creation of at least one distinct file path on a computing device used by the high-risk user to download files. Determination module 106 may make determinations about file path creation times in a similar way to how determination module 106 may make determinations about file download times, as explained in more detail above.

In some embodiments, determination module 106 may periodically update the high-risk pattern of download behavior. In these embodiments, identification module 104 may identify a new set of users that are at high risk for malicious downloads and determination module 106 may update the high-risk pattern of download behavior in response to at least one change in download behavior between the set of high-risk users and the new set of high-risk users. For example, determination module 106 may determine that previously benign file path "C:\Program Files\Malicious Toaster Games Inc" now has a reputation below the predefined reputation score threshold, and thus downloads to that directory should now be considered high-risk download behaviors. In another example, determination module 106 may determine, based on download behavior observed in the new set of high-risk users, that the command and control servers for a prolific piece of malware now send the command to download files at 3 A.M. GMT instead of 12 A.M. GMT. In this example, determination module 106 may determine that file downloads at 12 A.M. GMT should be weighted lower than previously within the high-risk pattern of download behavior while file downloads at 3 A.M. GMT should be highly weighted as part of the high-risk pattern of download behavior.

In some embodiments, the new set of high-risk users may overlap with the original set of high-risk users. In other embodiments, the new set of high-risk users may be composed of entirely new users who have not been previously monitored. FIG. 4 is a flow diagram of an exemplary method 400 for determining malicious-download risk based on user behavior that illustrates the cycle of creating and refining the high-risk pattern of download behavior by monitoring users. As illustrated in FIG. 4, at step 402, the systems described herein may monitor the download behavior of a set of users over a predefined time period. The predefined time period may be a week, a month, several months, and/or any other suitable time period. At step 404, the systems described herein may categorize users that are infected with malware as high-risk users and users who did not become infected as low-risk users. In some embodiments, the systems described herein may only categorize users as high-risk if they became infected with malware during the monitoring period. In other embodiments, the systems described herein may categorize users as high risk if they started the monitoring period with a malware infection. At step 406, the systems described herein may determine high-risk download behavior shared by the high-risk users. In some embodiments, the systems described herein may use machine-learning algorithms to determine the high-risk pattern of download behavior. At step 408, the systems described herein may continue monitoring all of the users. The systems described herein may then return to step 406, re-categorizing users as appropriate. For example, a low-risk user who becomes infected with malware may be re-categorized as a high-risk user. At step 410, the systems described herein may begin monitoring a new set of users. In some examples, the systems described herein may discover additional data about what constitutes high-risk download behavior by having a larger sample size of users and download behavior available for analysis.

Returning to FIG. 3, at step 306, one or more of the systems described herein may analyze the download behavior of an uncategorized user over a predefined time period in order to categorize the download behavior as high-risk or low-risk. For example, analysis module 108 may, as part of computing device 202 in FIG. 2, analyze the download behavior of uncategorized user 212 over a predefined time period in order to categorize the download behavior as high-risk or low-risk.

Analysis module 108 may analyze the download behavior of the uncategorized user in a variety of ways. For example, analysis module 108 may compare the download behavior of the user to the high-risk pattern of download behavior in order to detect similarities. In some embodiments, analysis module 108 may collect download behavior in real time, recording information about each new file download as it happens. In other embodiments, analysis module 108 may collect download behavior at predefined intervals. For example, every hour, analysis module 108 may record data about all new files that have been downloaded in the past hour.

At step 308, one or more of the systems described herein may categorize the uncategorized user as a high-risk user in response to determining that the download behavior of the uncategorized user falls within a predefined similarity threshold of the high-risk pattern of download behavior. For example, categorization module 110 may, as part of computing device 202 in FIG. 2, categorize uncategorized user 212 as a high-risk user in response to determining that the download behavior of uncategorized user 212 falls within a predefined similarity threshold of high-risk pattern of download behavior 122.

Categorization module 110 may categorize the user in a variety of ways. For example, categorization module 110 may categorize the user as high risk if the user's behavior is 90% similar to the high-risk pattern of download behavior. In another example, categorization module 110 may categorize the user as high-risk if the weighted score of the user's download behavior surpasses a minimum threshold for risky download behavior. Additionally or alternatively, categorization module 110 may categorize a user as high-risk by using a machine-learning technique.

In some embodiments, categorization module 110 may occasionally re-categorize a user. In one embodiment, analysis module 108 may periodically analyze additional download behavior of a previously categorized user with an assigned risk category over an additional predefined time period in order to categorize the download behavior as high-risk or low-risk. In this embodiment, categorization module 110 may adjust the assigned risk category of the previously categorized user in response to determining that the download behavior of the previously categorized has changed with respect to the high-risk pattern of download behavior. For example, a previously low-risk user may have changed their pattern of download behavior to more closely resemble the high-risk pattern of download behavior and may now be a high-risk user. In another example, a previously high-risk user may have decreased their risky download behavior and may now be a low-risk user. In some examples, categorization module 110 may move a user between risk categories, such as moderate-risk and high-risk, if the user's new pattern of download behavior is higher risk than previously. In some embodiments, analysis module 108 may re-analyze a user's behavior at set intervals, such as once a month, and categorization module 110 may adjust the user's category at the end of each interval.

In some embodiments, the systems described herein may perform one or more security actions in response to categorization module 110 categorizing the user as high-risk. FIG. 5 is a block diagram of an exemplary computing system 500 for determining malicious-download risk based on user behavior and taking appropriate security actions. As illustrated in FIG. 5, modules 102 may analyze the download behavior of a user 502 on a computing device 504 and may send a categorization of user 502 to a security module 506. Security module 506 may communicate with security system 508 and/or computing devices belonging to organization 510.

Security module 506 may take a number of different actions. In some examples, security module 506 may increase the security posture of user 502 in order to reduce the risk of user 502 becoming infected with malware. For example, security module 506 may increase the restrictiveness of the settings on computing devices 504's firewall, spam filter, and/or other similar applications. In another example, security module 506 may suggest and/or schedule more frequent anti-virus scans on computing device 504. In some examples, security module 506 may recommend and/or install additional security applications on computing device 504. Additionally or alternatively, security module 506 may display a warning to user 502 about their risky download behavior.

In some examples, security module 506 may increase the security posture of organization 510 in order to reduce the risk of computing devices used by organization 510 becoming infected with malware due to user 502's high-risk download behavior. For example, security module 506 may restrict traffic from computing device 504 in order to prevent malware from spreading to the rest of the organization. In another example, security module 506 may recommend and/or install additional security applications onto computing devices used by organization 510. Additionally or alternatively, security module 506 may increase the restrictiveness of settings on firewalls, routers, spam filters, and/or other similar systems used by organization 510. In some embodiments, security module 506 may only increase organization 510's security posture if the number of users belonging to organization 510 who classify as high-risk users surpasses a predefined threshold. For example, security module 506 may only increase organization 510's security posture if at least 10% of the users within organization 510 are categorized as high-risk users. In some examples, security module 506 may identify user 502 and/or any other high-risk users within organization 510 to an administrator within organization 510.

Additionally or alternatively, security module 506 may collect additional data about user 502 in order to improve the accuracy of the high-risk pattern of download behavior at predicting malware infections and/or improve the accuracy of additional malware-infection-prediction systems. For example, security module 506 may collect data about the browsing habits of user 502 and/or the configuration of computing device 504. In some embodiments, modules 102 may use the additional data to better classify future users as low-risk or high-risk. Additionally or alternatively, security module 506 may send the additional data to security system 508. In some embodiments, security system 508 may include a malware-infection-prediction algorithm that uses different data and/or different algorithms than modules 102. In other embodiments, security system 508 may include security applications that can protect computing device 504 and/or a network to which computing device 504 is connected and that adjust their function based on data about user 502's behavior.

As described in connection with method 300 above, the systems and methods described herein may help protect users and/or organizations from malware by using users' download behavior to predict the risk that those users will become infected with malware. The systems described herein may monitor an initial set of users to build a ground truth set of data on what constitutes risky download behavior, then continue to refine that data by continuously gathering information on user download behavior and subsequent malware infection rates. The systems described herein may then use the data on risky download behavior to predict the likelihood that uncategorized users will encounter malware based on their download behavior. By accurately predicting which users will intentionally or unwittingly download malware in the near future, the systems described herein may enable security systems to adjust to better protect users and organizations.

Figure 6:
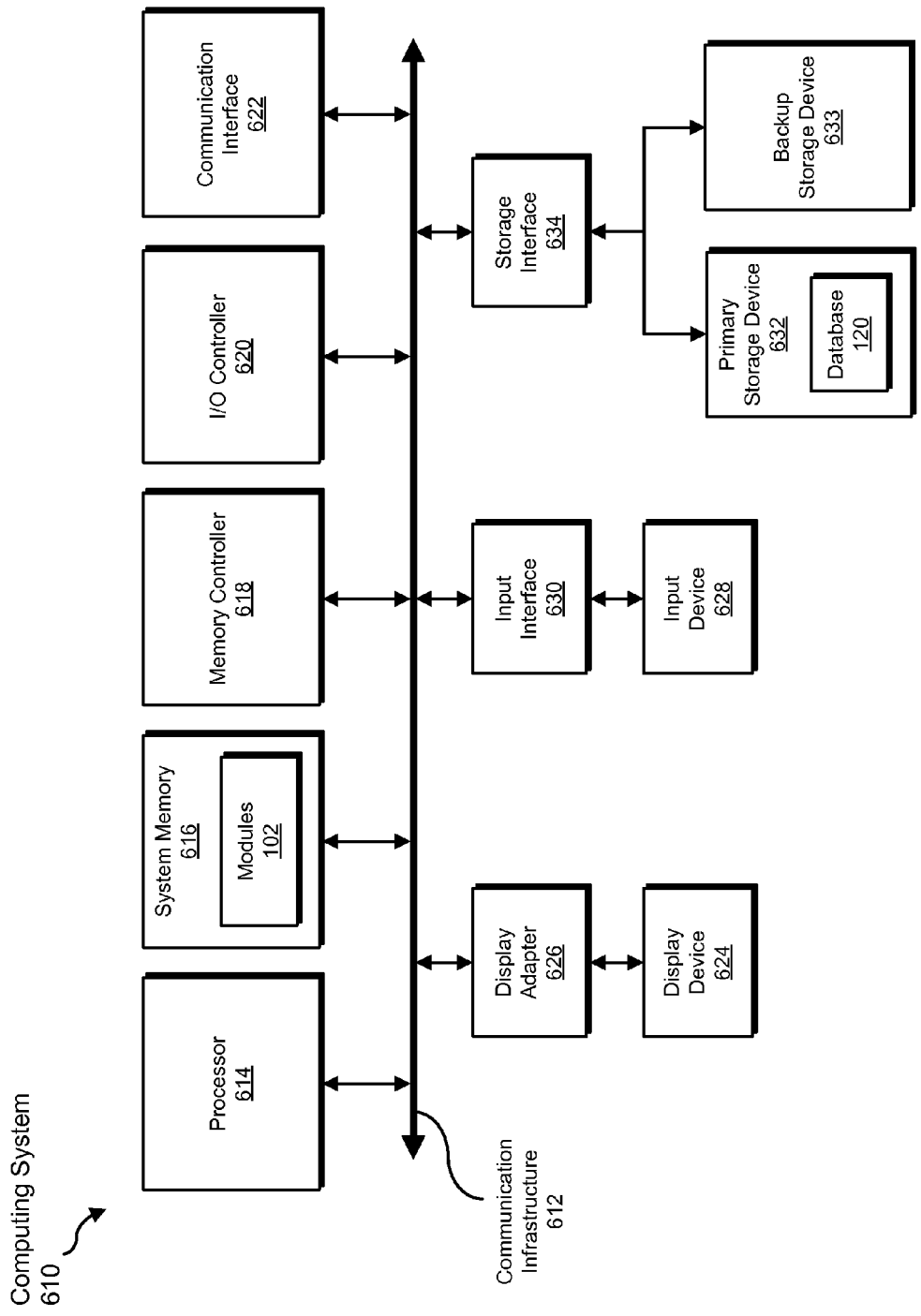
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
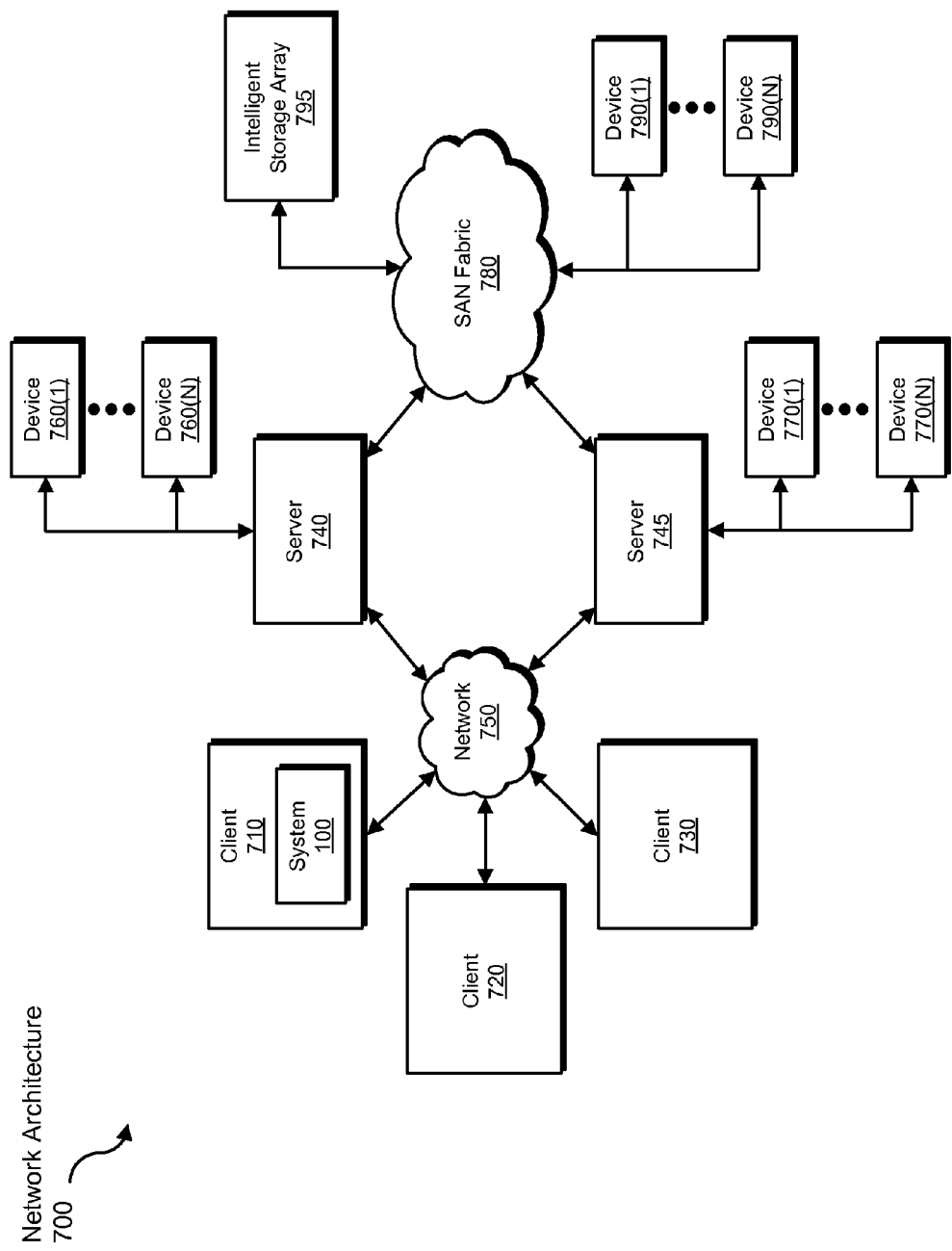
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for determining malicious-download risk based on user behavior.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive download data to be transformed, transform the download data into a pattern of download behavior, output a result of the transformation to a database, use the result of the transformation to determine malicious-download risk, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining malicious-download risk based on user behavior, at least a portion of the method being performed by a computing device comprising at least one processor, the method comprising:
   identifying a set of users that are at high risk for malicious downloads and a set of users that are at low risk for malicious downloads;
   determining a high-risk pattern of download behavior that is shared by the set of high-risk users and that is not shared by the set of low-risk users;
   analyzing download behavior of an uncategorized user over a predefined time period in order to categorize the download behavior as high-risk or low-risk;
   categorizing the uncategorized user as a high-risk user in response to determining that the download behavior of the uncategorized user falls within a predefined similarity threshold of the high-risk pattern of download behavior, wherein the high-risk pattern of download behavior comprises downloading at least one file that is found on fewer than a predefined percentage of computing devices used by others; and
   increasing a security posture of the high-risk user in order to reduce the risk of the high-risk user becoming infected with malware, wherein increasing the security posture comprises increasing a restriction of at least one of firewall settings or spam filter settings associated with the computing device.

2. The computer-implemented method of claim 1, further comprising collecting additional data about the high-risk user in order to at least one of:
   improve the accuracy of the high-risk pattern of download behavior at predicting malware infections;
   improve the accuracy of additional malware-infection-prediction systems.

3. The computer-implemented method of claim 1, further comprising increasing the security posture of an organization that includes the high-risk user in order to reduce the risk of computing devices used by the organization becoming infected with malware.

4. The computer-implemented method of claim 1, wherein identifying the set of high-risk users and the set of low-risk users comprises:
   monitoring download behavior of a set of unclassified users over a predefined download monitoring time period;
   classifying users whose computing devices became infected with malware during the predefined download monitoring time period as the set of high-risk users;
   classifying users whose computing devices did not become infected with malware during the predefined download monitoring time period as the set of low-risk users.

5. The computer-implemented method of claim 1, wherein the high-risk pattern of download behavior further comprises at least one of:
   a total number of files on a computing device used by the high-risk user to download files;
   a reputation score that applies to at least one file on a computing device used by the high-risk user to download files and that is below a predefined reputation score threshold;
   a timestamp of a download of at least one file on a computing device used by the high-risk user to download files;
   a category of at least one file on a computing device used by the high-risk user to download files.

6. The computer-implemented method of claim 1, wherein the high-risk pattern of download behavior further comprises at least one of:
   a total number of distinct file names on a computing device used by the high-risk user to download files;
   a reputation score that applies to at least one distinct file name on a computing device used by the high-risk user to download files and that is below a predefined reputation score threshold;
   at least one distinct file name that is on a computing device used by the high-risk user to download files and that is below a predefined frequency threshold on computing devices used by other users;
   a timestamp of a download of at least one distinct file name on a computing device used by the high-risk user to download files.

7. The computer-implemented method of claim 1, wherein the high-risk pattern of download behavior further comprises at least one of:
   a total number of distinct file paths on a computing device used by the high-risk user to download files;
   a reputation score that applies to at least one distinct file path on a computing device used by the high-risk user to download files and that is below a predefined reputation score threshold;
   at least one distinct file path that is on a computing device used by the high-risk user to download files and that is below a predefined frequency threshold on computing devices used by other users;
   a timestamp of a creation of at least one distinct file path on a computing device used by the high-risk user to download files.

8. The computer-implemented method of claim 1, further comprising:
   periodically analyzing additional download behavior of a previously categorized user with an assigned risk category over an additional predefined time period in order to categorize the download behavior as high-risk or low-risk;
   adjusting the assigned risk category of the previously categorized user in response to determining that the download behavior of the previously categorized has changed with respect to the high-risk pattern of download behavior.

9. The computer-implemented method of claim 1, further comprising:
   identifying a new set of users that are at high risk for malicious downloads;
   updating the high-risk pattern of download behavior in response to at least one change in download behavior between the set of high-risk users and the new set of high-risk users.

10. A system for determining malicious-download risk based on user behavior, the system comprising:
    an identification module, stored in memory, that identifies a set of users that are at high risk for malicious downloads and a set of users that are at low risk for malicious downloads;

a determination module, stored in memory, that determines a high-risk pattern of download behavior that is shared by the set of high-risk users and that is not shared by the set of low-risk users;

an analysis module, stored in memory, that analyzes download behavior of an uncategorized user over a predefined time period in order to categorize the download behavior as high-risk or low-risk;

a categorization module, stored in memory, that categorizes the uncategorized user as a high-risk user in response to determining that the download behavior of the uncategorized user falls within a predefined similarity threshold of the high-risk pattern of download behavior, wherein the high-risk pattern of download behavior comprises downloading at least one file that is found on fewer than a predefined percentage of computing devices used by others;

a security module that increases a security posture of the high-risk user in order to reduce the risk of the high-risk user becoming infected with malware, wherein increasing the security posture comprises increasing a restriction of at least one of firewall settings or spam filter settings associated with the computing device; and at least one physical processor configured to execute the identification module, the determination module, the analysis module, and the categorization module.

11. The system of claim 10, wherein the security module collects additional data about the high-risk user in order to at least one of:
improve the accuracy of the high-risk pattern of download behavior at predicting malware infections;
improve the accuracy of additional malware-infection-prediction systems.

12. The system of claim 10, wherein the security module increases the security posture of an organization that includes the high-risk user in order to reduce the risk of computing devices used by the organization becoming infected with malware.

13. The system of claim 10, wherein the identification module identifies the set of high-risk users and the set of low-risk users by:
monitoring download behavior of a set of unclassified users over a predefined download monitoring time period;
classifying users whose computing devices became infected with malware during the predefined download monitoring time period as the set of high-risk users;
classifying users whose computing devices did not become infected with malware during the predefined download monitoring time period as the set of low-risk users.

14. The system of claim 10, wherein the high-risk pattern of download behavior further comprises at least one of:
a total number of files on a computing device used by the high-risk user to download files;
a reputation score that applies to at least one file on a computing device used by the high-risk user to download files and that is below a predefined reputation score threshold;
a timestamp of a download of at least one file on a computing device used by the high-risk user to download files;
a category of at least one file on a computing device used by the high-risk user to download files.

15. The system of claim 10, wherein the high-risk pattern of download behavior further comprises at least one of:

a total number of distinct file names on a computing device used by the high-risk user to download files;
a reputation score that applies to at least one distinct file name on a computing device used by the high-risk user to download files and that is below a predefined reputation score threshold;
at least one distinct file name that is on a computing device used by the high-risk user to download files and that is below a predefined frequency threshold on computing devices used by other users;
a timestamp of a download of at least one distinct file name on a computing device used by the high-risk user to download files.

16. The system of claim 10, wherein the high-risk pattern of download behavior further comprises at least one of:
a total number of distinct file paths on a computing device used by the high-risk user to download files;
a reputation score that applies to at least one distinct file path on a computing device used by the high-risk user to download files and that is below a predefined reputation score threshold;
at least one distinct file path that is on a computing device used by the high-risk user to download files and that is below a predefined frequency threshold on computing devices used by other users;
a timestamp of a creation of at least one distinct file path on a computing device used by the high-risk user to download files.

17. The system of claim 10, wherein:
the analysis module periodically analyzes additional download behavior of a previously categorized user with an assigned risk category over an additional predefined time period in order to categorize the download behavior as high-risk or low-risk;
the categorization module adjusts the assigned risk category of the previously categorized user in response to determining that the download behavior of the previously categorized has changed with respect to the high-risk pattern of download behavior.

18. A non-transitory computer-readable medium comprising one or more computer-readable instructions that, when executed by at least one processor of a computing device, cause the computing device to:
identify a set of users that are at high risk for malicious downloads and a set of users that are at low risk for malicious downloads;
determine a high-risk pattern of download behavior that is shared by the set of high-risk users and that is not shared by the set of low-risk users;
analyze download behavior of an uncategorized user over a predefined time period in order to categorize the download behavior as high-risk or low-risk;
categorize the uncategorized user as a high-risk user in response to determining that the download behavior of the uncategorized user falls within a predefined similarity threshold of the high-risk pattern of download behavior, wherein the high-risk pattern of download behavior comprises downloading at least one file that is found on fewer than a predefined percentage of computing devices used by others; and
increase a security posture of the high-risk user in order to reduce the risk of the high-risk user becoming infected with malware, wherein increasing the security posture comprises increasing a restriction of at least one of firewall settings or spam filter settings associated with the computing device.

* * * * *